United States Patent [19]

Suetsugu et al.

[11] Patent Number: 5,198,655
[45] Date of Patent: Mar. 30, 1993

[54] IMAGE READING DEVICE HAVING A LIGHT WAVEGUIDE MEANS WIDENED TOWARD AN END NEAREST TO AN IMAGE SURFACE

[75] Inventors: Kenichiro Suetsugu, Amagasaki; Tetsuo Fukushima, Katano; Tokuhito Hamane, Nara; Junji Ikeda, Ikoma; Yukio Maeda, Hirakata, all of Japan

[73] Assignee: Matsushita Electric Industrial Co., Ltd., Osaka, Japan

[21] Appl. No.: 642,271

[22] Filed: Jan. 15, 1991

[30] Foreign Application Priority Data

Jan. 17, 1990 [JP] Japan .................. 2-7395

[51] Int. Cl.⁵ .................. H01J 40/14; H01J 5/16
[52] U.S. Cl. .................. 250/208.10; 250/227.20
[58] Field of Search .......... 250/208.1, 227.20, 227.24, 250/227.29, 227.32, 227.28, 227.11; 350/96.10, 96.27; 382/59, 65, 66, 67; 358/484; 235/472, 473; 359/12

[56] References Cited

U.S. PATENT DOCUMENTS

| 3,248,554 | 4/1966 | Wu Chen | 250/227.11 |
|---|---|---|---|
| 3,953,730 | 4/1976 | Henry et al. | 235/473 |
| 4,379,225 | 4/1983 | Apothaker | 250/227.28 |
| 4,616,129 | 10/1986 | Yamada et al. | 250/227.11 |
| 4,734,783 | 3/1988 | Horikawa | 358/484 |
| 4,851,921 | 7/1989 | Sato et al. | 382/59 |

FOREIGN PATENT DOCUMENTS

| 57142603 | 9/1982 | European Pat. Off. . |
| 0068860 | 1/1983 | European Pat. Off. . |
| 58-106947 | 6/1983 | Japan . |
| 1407544 | 9/1975 | United Kingdom . |

Primary Examiner—David C. Nelms
Assistant Examiner—John R. Lee
Attorney, Agent, or Firm—Wenderoth, Lind & Ponack

[57] ABSTRACT

An image reading device includes: a light emitting element for irradiating light on an image surface; a light receiving element for receiving image information in the form of reflected light from the image surface; and light waveguide passages provided between the light emitting element and the image surface and between the light receiving element and the image surface, respectively, and at least the light waveguide passage for the light emitting element is widened at an end surface thereof at the image surface to a width wider than at the end surface at the light emitting element.

3 Claims, 5 Drawing Sheets

IMAGE READING DEVICE HAVING A LIGHT WAVEGUIDE MEANS WIDENED TOWARD AN END NEAREST TO AN IMAGE SURFACE

BACKGROUND OF THE INVENTION

The present invention relates to an image reading device, and more particularly, to an image reading device to be used in a facsimile, an image scanner, and the like.

An image reading device is adapted to read image information by arranging light recipient elements such as photosensors in an array so as to read an image by dividing it into minute picture elements and by scanning the array of light recipient elements along the image surface. In order to read image information correctly, a light emitting means is necessary to irradiate a sufficient amount of light onto the image surface. In the conventional image reading device, light emitting means in the form of emitting elements such as LEDs are arranged in an array like the light recipient elements of the device so that the light irradiated from these light emitting elements is reflected by the image surface so as to be incident upon the light recipient elements.

FIG. 10 shows a general construction of a conventional image reading device, in which an end surface of a light waveguide 3 whose light guiding core portion 3a is covered by a cladding portion 3b confronts the light receiving surface of a photosensor 1 installed on a circuit board 2, and the waveguide 3 is arranged downward in the vertical direction with the other end surface thereof being positioned adjacent to the image surface of an original 4, and the light waveguide 3 is installed on a base stand 6 constituting the main body of the image reading device.

To one side of the light waveguide 3, there is provided an LED 5 installed on a separate circuit board 5a from the circuit board 2. The LED 5 is installed near the tip end of the light waveguide 3 in a downward angled direction so that the light emitted from the LED 5 efficiently irradiates the image surface immediately below the end surface of the light waveguide 3, and the light reflected by the image surface of the original 4 is introduced excellently into the light waveguide 3 arranged in the vertical direction. In order to arrange the LED 5 in the angled direction, the LED 5 and the circuit board 5a are fastened on an inclined surface of the base stand 6. The circuit board 2 carrying the photosensor 1 is fastened on the upper surface of the base stand 6 with a small screw 2a, with a cover 6a being installed above the base stand 6 so as to cover the photosensor 1 and circuit board 2.

It is to be noted here that a large number of photosensors 1 and LEDs 5 are arranged in parallel in an array in a direction perpendicular to the plane of the drawing so that the image reading throughout the entire length of the original is possible by reading the image in a transverse linear direction.

However, in such a conventional image reading device as described above, the LEDs 5 corresponding to the photosensors 1 constituting picture elements throughout the entire length of the image reading range are required to be arranged in parallel, so that there has been a problem that the manufacture of such an LED array is troublesome and high in cost. Furthermore, when the image reading range becomes long, the control circuit for the LED 5 becomes long, which makes the manufacturing cost of the circuit board 5a expensive. Further, a problem also exists with the arrangement of the photosensors 1 as light recipient elements.

Furthermore, in the conventional image reading device, since the light of the LEDs 5 is arranged to be incident directly upon the image surface, there has been such problems that in order to apply light properly, the installation position and posture of the LEDs are restricted and are troublesome.

SUMMARY OF THE INVENTION

Accordingly, an essential object of the present invention is to provide an image reading device which is simplified in structure and capable of easy manufacture to low cost in an image reading device provided with the above-described photosensor, such as a light recipient element, and an LED array, as a light emitting element.

In accomplishing these and other objects, according to one aspect of the present invention, there is provided an image reading device comprising: a light emitting element for irradiating light on an image surface; a light recipient element for receiving image information by reflected light from the image surface; a light recipient element for receiving image information by reflected light from the image surface; and light waveguide passages provided between the light emitting element and the image surface, respectively, with at least the light waveguide passage for the light emitting element formed so as to be widened at an end surface thereof at an image surface end so that it is wider than at an end surface thereof at the light emitting end.

By the above construction of the present invention, since at least the light waveguide passage for the light emitting element among the light waveguide passages provided between the image surface and the light emitting element and the light recipient element is formed so as to be widened at the end surface at the image surface end so that it is wider than at the end surface at the light emitting element end, it becomes possible to irradiate light uniformly not only onto an image surface immediately below the light emitting element but also onto an image surface of a wider range. For example, if the image end surface of the light waveguide passage provided for one light emitting element is widened so as to cover the entire length of the image reading range of the whole device, it is possible to irradiate light onto the entire length of the image reading range with one light emitting element. In a similar manner, it is possible to irradiate light over the entire length of the image reading range using a smaller number of light emitting elements.

Furthermore, as for the light recipient element, if a plurality of light recipient elements are collectively installed on one mounting chip, and respective light waveguide passages connected to this chip are widened at the end surface at the image surface end so that the image reading over the entire length of the image reading range is possible, it is similarly possible to read the image information of the entire image reading range with one light recipient element chip or several light recipient element chips.

In the case where the light emitting element and/or the light recipient elements are divided into a plurality of groups, when light waveguide passages are arranged in the same width from the element side to the image surface side, since the intermediate portion between the light emitting elements or the light recipient elements of each group is away from the light waveguide passage, the image surface becomes dark and it becomes impossible to read an image. However, when the light waveguide passage is widened at the image surface end as described above, it is possible to irradiate light on the intermediate portion and to read an image by advantageously irradiating light over an entire length of the image reading range.

Furthermore, since the light waveguide passage is provided between the light emitting element and the image surface, it is possible to apply light onto an arbitrary point and in an arbitrary direction irrespective of the installation position and posture of each of the light emitting element and the light recipient element so as to read image information.

According to another aspect of the present invention, there is provided an image reading device, wherein a plurality sets of the light emitting elements and light recipient elements are arranged alternately in a lengthwise direction of the image reading device, and a respective light waveguide passages for each set of a light emitting element and a light recipient element arranged at an interval are formed so as to be widened at the respective end surfaces on the ends of the light emitting element and the light recipient element, respectively and further, the light waveguide passages of adjacent sets are formed as to communicate with each other.

By the above construction according to this aspect of the present invention, in addition to the above-described first aspect of the present invention, the light emitting elements and the light recipient elements can be efficiently arranged collectively by arranging plural sets of light emitting elements and light recipient elements alternately along the lengthwise direction of the image reading range, whereby the structure of the mounting circuit board becomes simplified.

In this case, since the light emitting element of the light recipient element of each set is arranged at an interval, it is impossible to irradiate light uniformly or read an image over the entire length of the image reading range if no further provisions is made. However, according to the second aspect of the present invention, since respective light waveguide passages for each set of a light emitting element and light recipient element arranged at an interval are formed so as to be widened at the end surface at the image surface end so that it is wider than at the end surface at the light emitting element end or the light recipient end, and light waveguide passages of adjacent sets are formed so as to communicate with each other, it is possible to read an image over the entire length of the image reading range.

DESCRIPTION OF THE DRAWINGS

These and other objects and features of the present invention will become clear from the following description taken in conjunction with the accompanying drawings, in which.

DETAILED DESCRIPTION OF THE EMBODIMENTS

Figure 1:
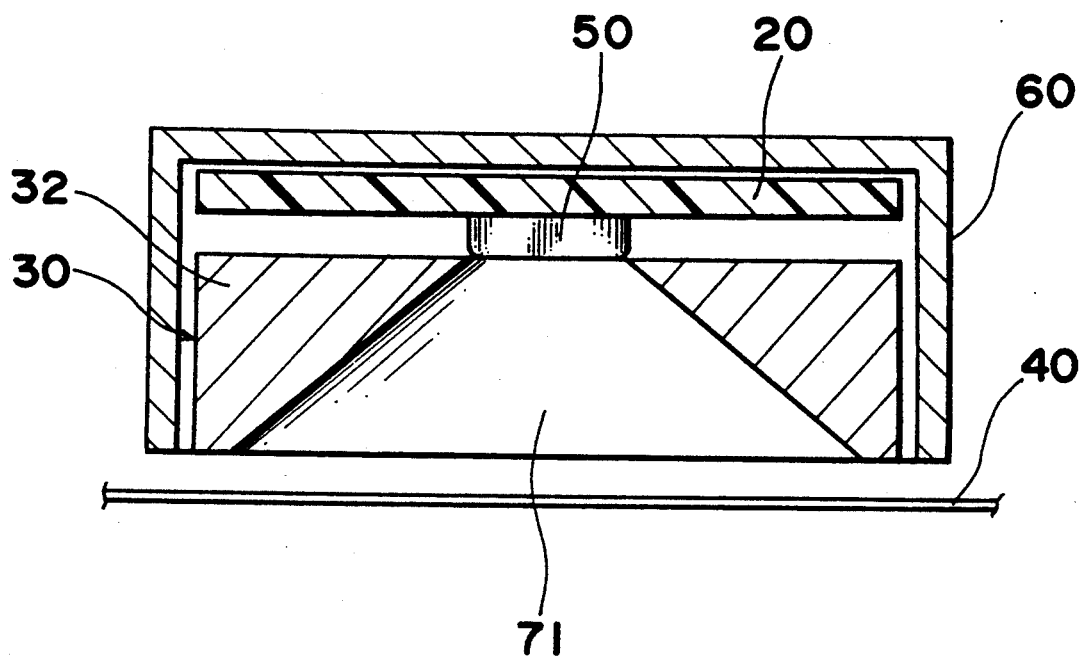
FIG. 1 is a sectional view of the light emitting element part of an image reading device according to a preferred embodiment of the present invention.

Before the description of the present invention proceeds, it is to be noted that like parts are designated by like reference numerals throughout the accompanying drawings.

Figure 2:
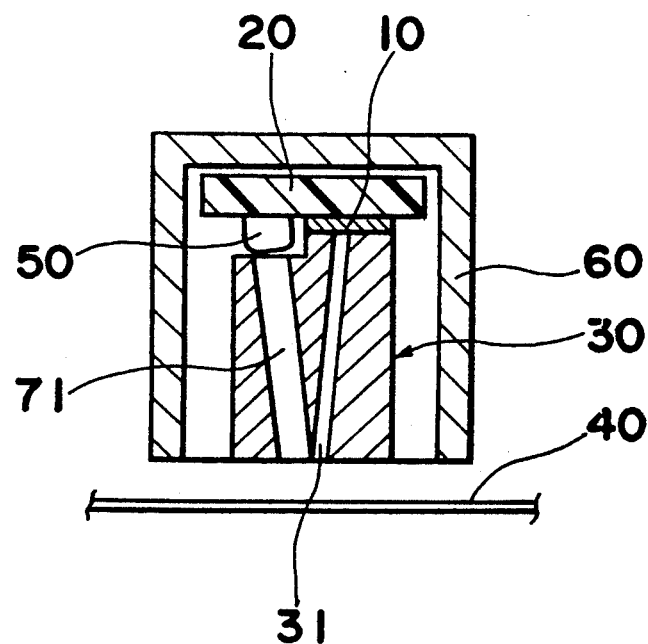
FIG. 2 is a sectional view of the embodiment of FIG. 1 in the direction perpendicular to that of FIG. 1.
Figure 3:
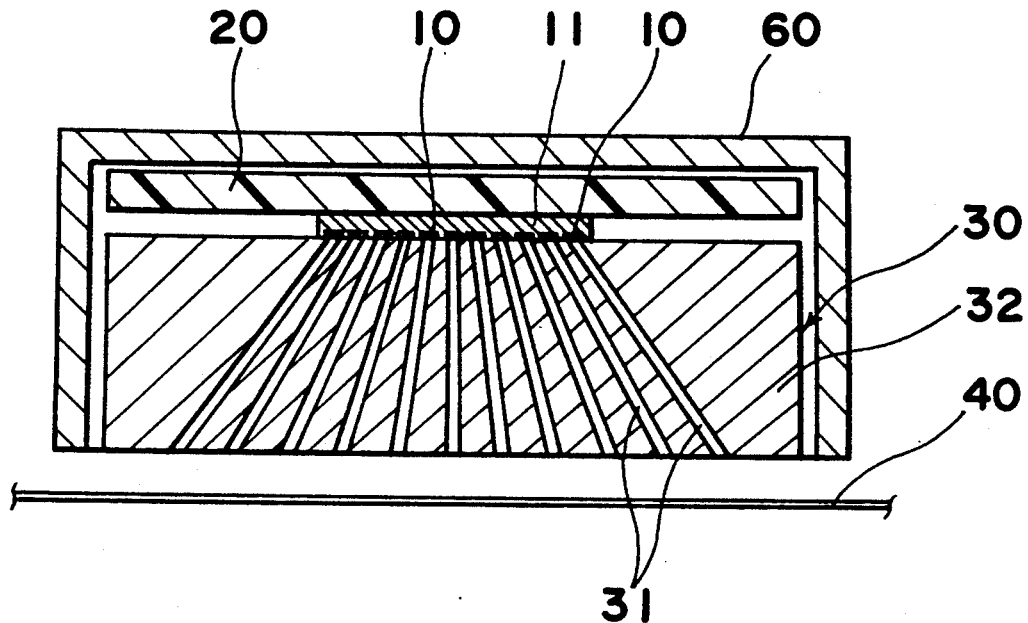
FIG. 3 is a sectional view of the light recipient element part thereof.

FIGS. 1 and 3 are sectional views of an image reading device according to an embodiment of the present invention cut along a line parallel to the image reading line, while FIG. 2 is a sectional view thereof in a direction perpendicular to the image reading line. As shown in FIG. 2, on the surface of a circuit board 20, there are mounted a light recipient or receiving element 10 composed of, for example, photosensors and a light emitting element 50 composed of, for example, LED's with a certain interval therebetween.

As shown in FIG. 1, the light emitting element 50 is provided only at one place approximately in the central portion of the image reading device. This light emitting element 50 can be a single light emitting element with a large amount of light or an assembly of plural light emitting element units arranged in an array.

As shown in FIG. 3, a light recipient element chip 11 on which light recipient elements 10 corresponding to individual picture elements are mounted collectively in an array used as the light recipient element 10, and this light recipient chip 11 is provided only at one place approximately in the central portion of the image reading device in the same manner as the light emitting element 50.

Confronting the light receiving surface of the light element 10 and the light emitting surface of the light emitting element 50, there is arranged one end surface of a light waveguide 30, with the other end surface thereof at a position close to the image surface of an original 40. The light waveguide 30 is composed of core portions 31 which confront the light receiving surface of the light recipient element 10 to serve as light waveguide passages, core portions 71 which confront the light emitting surface of the light emitting 50 so as to serve as light waveguide passages, and a cladding portion 32 covering peripheries of respective core portions 31 and 71.

As shown in FIG. 1, the core portion 71 serving as the light waveguide passage of the light emitting element 50 confronts the light emitting surface of the light emitting element 50 at the upper end thereof and is widened toward the lower end thereof so as to cover the entire length of the image reading range at the lower end thereof. The core portions 31 serving as the light waveguide passage for the light recipient elements 10 are formed, as shown in FIG. 3, so that the interval between each of the adjacent core portions in a number of passage-shaped core portions 31 confronting individual light recipient elements 10 mounted on the light recipient element chip 11 widens divergently toward the image surface end, and thus a plurality of core portions 31 are arranged in a diverging state.

Besides the above-described LED or photosensor, appropriate elements selected from common photoelectric conversion elements or light emitting elements used in the well-known image reading devices and other electronic devices can be used as the light recipient element 10 and the light emitting element 50.

As the light waveguide 30, a structure and material similar to those used for constituting light waveguide passages in various kinds of optical apparatuses can be used. For example, a light waveguide made of a transparent material such as glass or high polymer and constructed so that core portions 31 and 71 having a large refraction index are provided therein and a cladding portion 32 having a small refraction index covers the entire periphery of each of the core portions 31 and 71. At the partition portion between the core portions 31 and 71, a cladding portion 32 is provided. The light introduced into the core portions 31 and 71 respectively from one end thereof is transmitted to the other end thereof while being reflected at the boundary surface between respective core portions 31 and 71 and the cladding portion 32.

As a specific material for the core portions 31 and 71 and the cladding portions 32, polycarbonate resins, epoxy resins, acrylic resins, or glass are used, and by adjustment of composition and mixture component resins or glass, the difference in refraction index can be produced. By mixing light absorption material or light dispersion material into the cladding portion 32, the resolution of the device can be increased. The light waveguide 30 made of such materials as described above can be manufactured by using a molding technique for resins or glass or a thin film processing technique in the same manner as is common for light waveguides.

It is to be noted here that the light waveguide 30 can be supported and fastened on the surface of the circuit board 20 or a support member or base stand (not shown) made of plastic separate from the circuit board 20. Further, the image reading device is also provided with a cover 60 covering the whole structure including the circuit board 20 and the light waveguide 30.

As shown in FIG. 2, the light emitting element 50 is mounted so that the direction of irradiation of light is directed angularly downward relative to the surface of the circuit board 20, and the core portion 71 is also formed so as to extend angularly downward. The core portion 31 of the light recipient element part is formed so as to be inclined in a direction opposite to that of the core portion 71 in the light emitting element part. Therefore, the two core portions 31 and 71 are positioned in the shape of a V.

In an image reading device having a structure as described above, light irradiated from the light emitting element 50 is spread out along the widened shape of the core portion 71 so as to be irradiated onto the entire length of the image surface, while passing through the core portion 71 of the light waveguide 30. The light reflected by the image surface, that is, the image information is inputted into the light recipient element 10 through the core portion 31 corresponding to each picture element, whereby the image information is read. In this case, in the core portions 31 leading to the light recipient element 10, since the separate image information for each individual picture element is needed, but the core portion 71 for the light emitting element can be integrated core portion.

Figure 4:
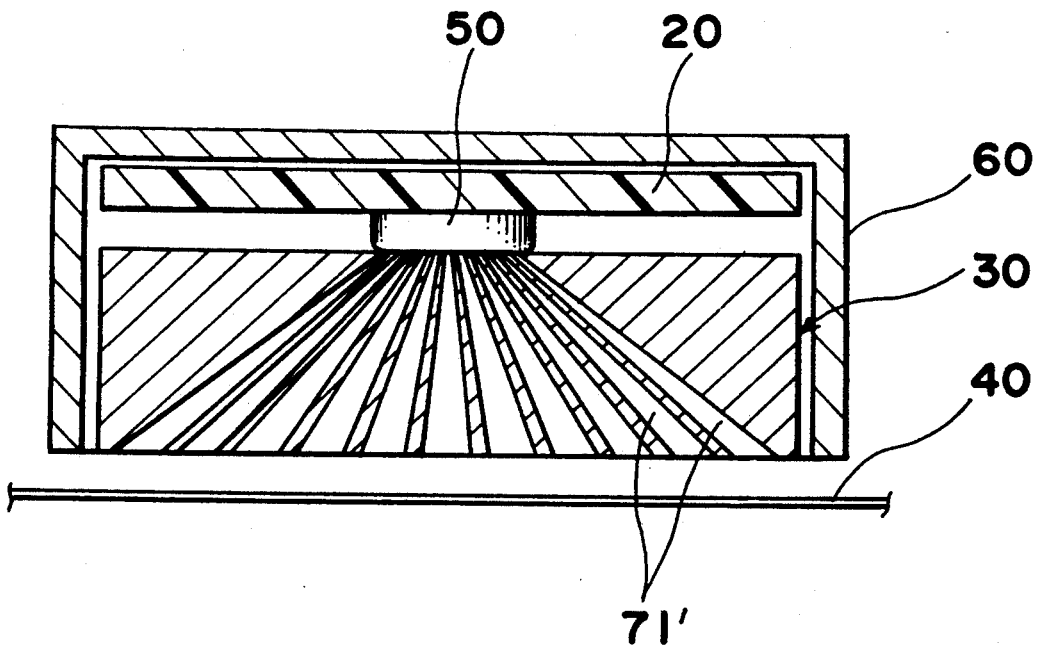
FIG. 4 is a sectional view of the light emitting element part of an image reading device according to another embodiment.

Next, the embodiment shown in FIG. 4 is different from the above-described embodiment in the structure of the core portion 71 for the light emitting element. In this embodiment, the core portion is not a single core portion, but divided into a plurality of core portions 71' in a divergently expanding shape, and respective core portions 71' are formed so as to be widened from the upper end toward the lower end thereof. In this embodiment, since light is securely and uniformly transmitted by respective core portions 71 to the image surface, the brightness difference of the image surface between a point immediately below the light emitting element 50 and a point spaced therefrom is reduced.

In respective embodiments described so far, although the light emitting element 50 and the light recipient element 10 are positioned approximately in the central position of the image reading range, the installation positions for the light emitting element 50 and the light recipient element 10 can be provided at an end portion of the image reading range or at any intermediate position, so long as the core portions 31 and 71 formed so as to widen from the position of the light emitting element 50 or the light recipient element 10 cover the entire length of the image reading range at the end face thereof at the image surface.

Although the core portion 71 shown in FIG. 1 has a linear contour, the contour of the core portion 71 can be formed in a curved line or a curved surface, to obtain the desired light distribution at the end surface at the image surface. Although the core portion 31 shown in FIG. 3 and the core portion 71' shown in FIG. 4 are respectively formed in a linear shape, similarly to the above, the present invention can be put into practice by giving the core portions 31 and 71 or 71' a curved contour. When core portions 31 and 71 or 71' are curved at a proper rate of curvature inside the core portions 31 and 71 or 71' covered by the cladding portion 32, light is positively transmitted from one end thereof to the other end, while being completely reflected therein, so that light can be transmitted more efficiently when the core portions 31 and 71 or 71' are formed in curved lines instead of straight lines.

Figure 5:
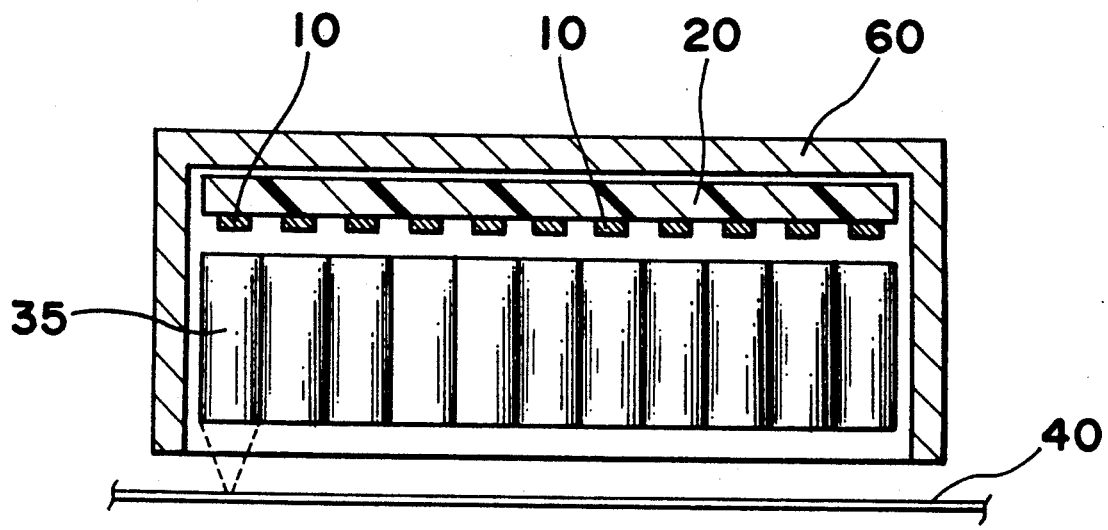
FIG. 5 is a sectional view of the light recipient element part of an image reading device according to a further other embodiment.
Figure 6:
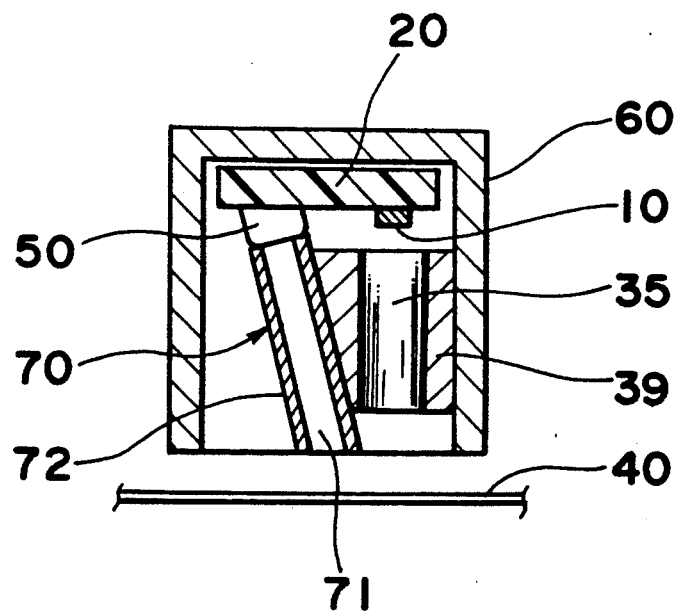
FIG. 6 is a sectional view of the embodiment of FIG. 5 in the direction perpendicular to that of FIG. 5.

Next, the embodiment shown in FIGS. 5 and 6 is different from the above-described embodiment in the construction of the light recipient element part. In the present embodiment, light recipient elements 10 are uniformly arranged over the entire image reading range so as to correspond to each of the picture elements for the image reading, and between respective light recipient elements 10 and the image surface, there are provided light waveguides, each composes of a refraction index distribution type optical fiber lens 35 arranged in line and integrally joined with a resin 39. Each refraction index distribution type fiber lens 35 is a glass fiber member which is provided with a lens function by properly adjusting the refraction index distribution in the core portion and the cladding portion, and a correct image can be efficiently read out by the condensing function of the lens when the image information picked up at the image surface is transmitted to the light recipient element 10. In other words, whereas the light waveguide 30 of the above-described embodiment is integrated into a single entity as a whole, in the present embodiment, fiber lens 35 manufactured in advance are arranged in a line. Since a light waveguide common to the light recipient element 10 and the light emitting element 50 is not used, for the light waveguide passages of the light emitting element part, there is used an exclusive use light waveguide 70 having the core portions 71 clad with cladding portions 72 and joined by the resin portion 39 to the fiber lenses 35 so as to be integrally joined thereto.

Figure 7:
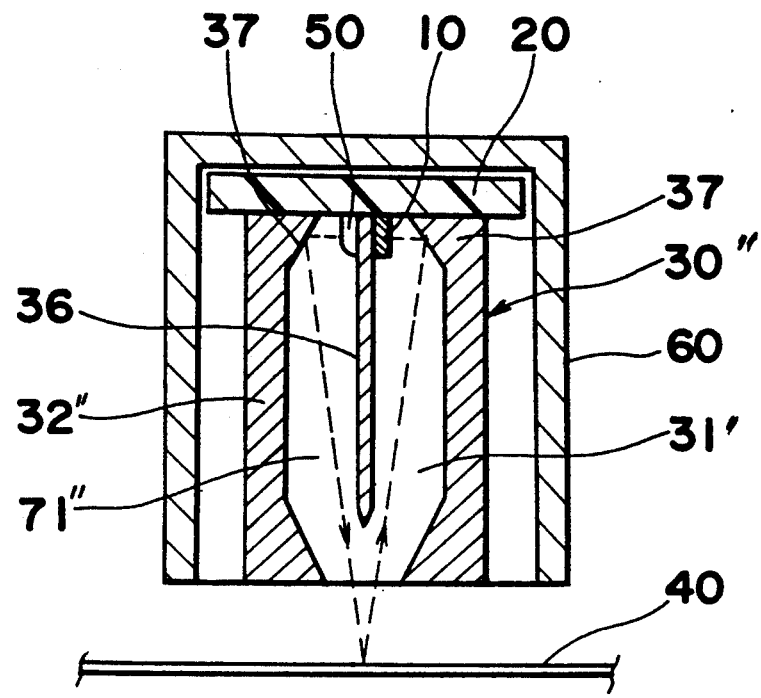
FIG. 7 is a sectional view of an image reading device according to a further embodiment of that present invention.

Next, the embodiment shown in FIG. 7 forms the light waveguide passage for the light emitting elements 50 and that for the light recipient elements 10 integrally and includes a partition. In the central portion of a light waveguide 30", there are formed the core portion 31" for the light emitting element and the core portion 71" for the light recipient element 10 with a partition member 36 disposed therebetween, and at the tip end of the partition member 36, adjacent core portions 31" and 71" are integrated completely. The light emitting element 50 and the light recipient element 10 are mounted back to back on both sides of the upper end of the partition member 36, and the light irradiated horizontally from the light emitting element 50 is reflected by a reflection surface 37 provided on the boundary between the core portion 71" and the clad portion 32" and is reflected downward so as to be incident upon the image surface through the core portion 71". The image information from the image surface is transmitted upward through the core portion 31", and reflected horizontally by the reflection surface 37 provided on the boundary between the core portion 31" and the clad portion 32" so as to be incident upon the light recipient element 10. Regarding the reflection surface 37, although the mere boundary surface between the core portion 31" and the clad portion 32" can produce reflection to some extent, it is more preferable to provide a separate reflection layer such as is used in the usual optical elements.

However, even in the above embodiment, it is possible to mount the light emitting element 50 and the light recipient element 10 in the downward direction as in the embodiments so far described. In such a case, it is not necessary to form the reflection surface 37. For the material of the partition member 36, various light shielding materials, for instance, material similar to that of the cladding portion 32 can be used, so long as the light transmitted through the right core portion 31" and the light transmitted through the left core 71" are kept separated from each other.

The structure of the light emitting element 50, the light recipient element 10, and the light waveguide passage in the direction perpendicular to the plane of FIG. 7 can be similar to those of respective embodiments so far described.

In the present embodiment, since the core portion 71" in the light emitting element part and the core portion 31" in the light recipient element part are integrated with each other, when the light waveguide 30" is manufactured, it is possible to adopt a method than when one of the core portions 71" or 31" is molded after manufacturing the components constituting the other of the core portions 31" or 71", the components are embedded so as to be molded simultaneously. Furthermore, if the light emitting element 50, the light recipient element 10, and the partition member 36 are embedded and molded at this time, as shown in FIG. 7, the entire essential portions relating to the light transmission and processing are integrated, whereby assembly tolerances between respective components can be set accurately and the light assembly and manufacture becomes easy. Since the light receiving surface of the light recipient element 10 and the light emitting surface of the light emitting element 50 are enclosed in the core portions 31" and 71", there is no possibility of the adhesion of dirt and foreign materials.

Figure 8:
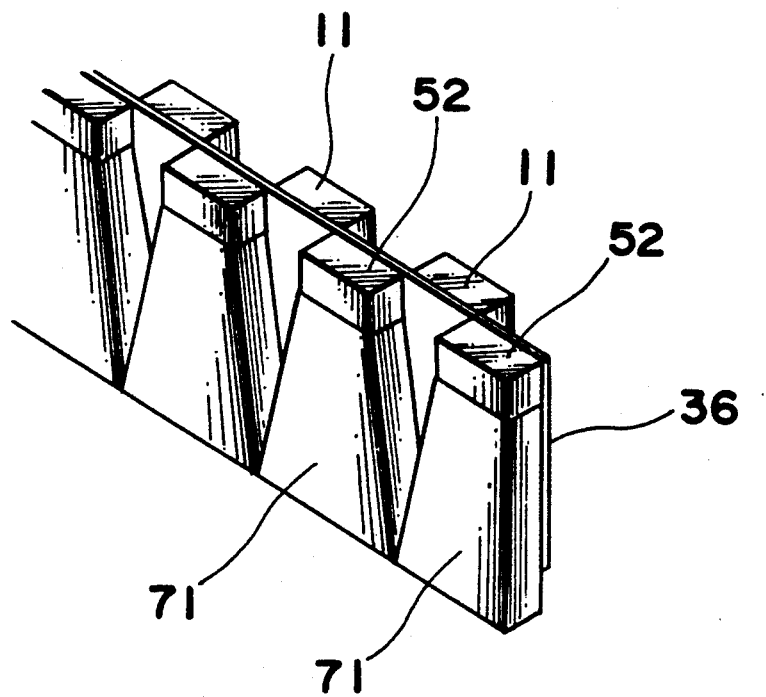
FIG. 8 is a schematic perspective view of a part of the embodiment of FIG. 7.
Figure 9:
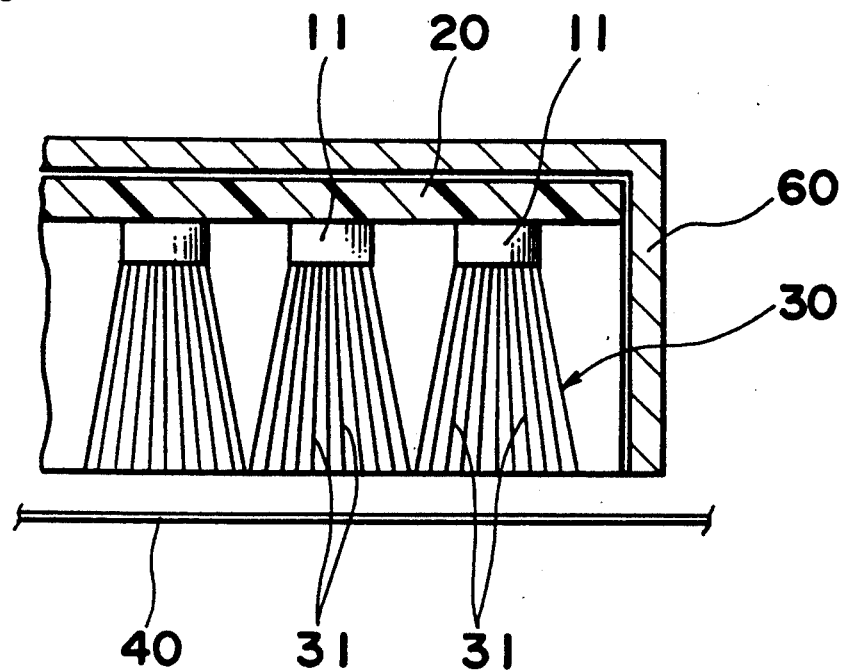
FIG. 9 is a schematic front view of the light recipient element part of the embodiment of FIG. 7.
Figure 10:
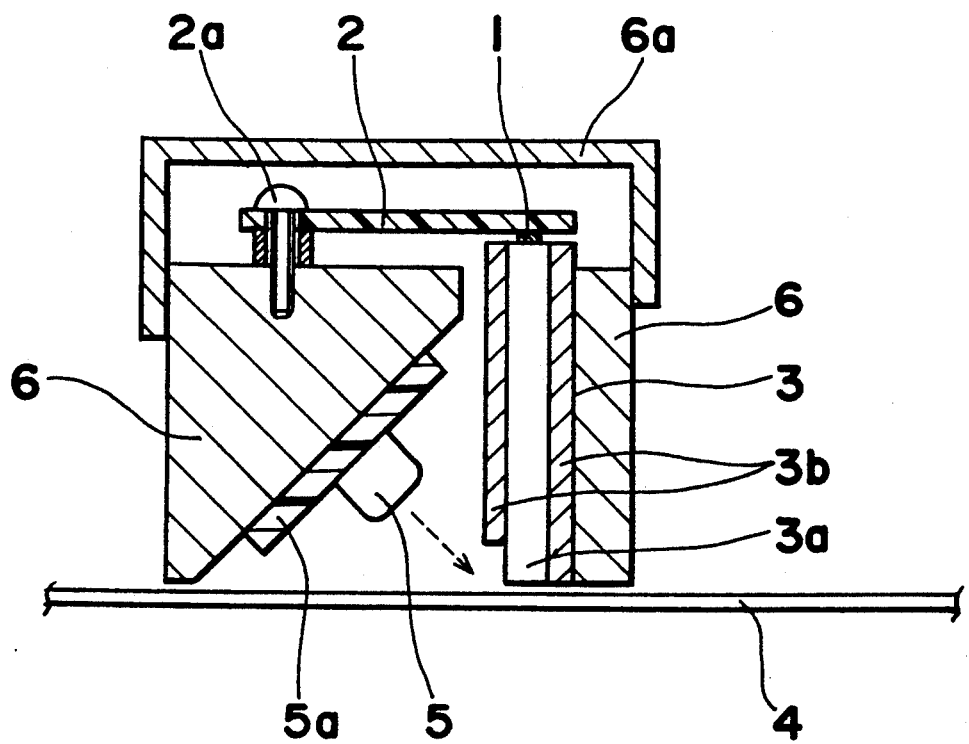
FIG. 10 is a sectional view of a conventional image reading device.

Embodiments shown in FIGS. 8 and 9 show schematically constructional examples of the light waveguide passage in the direction perpendicular to the plane of FIG. 7.

A plurality of light emitting element chips 52 composed of a single light emitting element 50 or an array of light emitting elements are arranged along one upper end surface of the partition member 36 at a certain interval in the longitudinal direction thereof. On the opposite surface of the partition member 36, there are arranged a plurality of light recipient element chips 11 at the positions corresponding to respective vacant spaces between the adjacent light emitting element chips 52. In other words, the light emitting element chips 52 and the light recipient element chips 11 are arranged alternately in the same direction.

Although the upper end of the core portion 71 which services as the light waveguide passage for the light emitting element chip 52 has a width corresponding to the light emitting surface of the light emitting element chip 52, the core 71 is formed so as to widen toward the lower end, and is arranged so that adjacent cores are in contact with each other at the lower end thereof, whereby light can be uniformly irradiated over the entire length in the image reading range.

As shown in FIG. 9, light waveguide passages from the light recipient element chip 11 are arranged so that an appropriate number of core portions 31 are grouped so as to confront the light receiving surface of the light recipient element chip 11 at the upper end thereof, and respective core portions 31 thus grouped for each light recipient element chip 11 are arranged to diverge downward so that the core portions are uniformly distributed over the entire length in the image reading range at the lower end thereof. It is to be noted here that as for the structure for the core portion 31, a structure of the core portion 71 etc., in the direction perpendicular to the plane of FIG. 9, can be employed similar to that of FIG. 7.

According to the present embodiment, since the light recipient element chips 11 and the light emitting element chips 52 are arranged alternately, the mounting and wiring of respective chips 11 and 52 can be easily performed by using a circuit board, etc., arranged on the upper surfaces of respective chips 11 and 52. Simply by increasing the number of the light recipient element chips 11 and the light emitting element chips 52 sequentially, it is possible to constitute an image reading device of any length, and even when the image transmitted length is increased further, the brightness of the image surface illuminated by the irradiated light remains unchanged and the image reading performance is not lowered.

In each of the embodiments described so far, it is possible to arrange the structure so that light easily enters the light waveguide 30 by notching the cladding 32 so as to expose a part of the core portion 31 or by cutting off the end face of the core portion 31 on an angle, on the image surface end of the light waveguide 30. Furthermore, when a lens of semi-circular shape is provided on the image surface tip end of each of the core portions 31 and 71, it is possible to execute an efficient light irradiation and image reading by condensing or deflecting the irradiated light and the reflected light. If a hard coating agent is used, or micro sheetglass is applied onto the image surface end face of the core portions 31 and 71, it is possible to prevent the wear of the end face of the core portions 31 and 71 due to contact with an original 40. Meanwhile, with respect to the detailed structure of the image reading devices other than described so far, various structures and shapes used in the ordinary image reading devices are usable.

The image reading device according to the embodiments of the present invention can be used in facsimiles, image scanners, copiers and any other application requiring image reading and electronic processing of a read image.

According to the image reading devices of the embodiments of the present invention described so far, since the light waveguide passage connecting the light emitting element to the image surface is formed so as to widen at the image surface end so that it is wider than at the light emitting element side, it becomes unnecessary to arrange light emitting elements over the entire image reading range. That is, for instance, the emitted light from a light emitting element positioned at one place can be spread out by a light waveguide passage or passages so as to irradiate the entire range of the image reading surface, or the light emitted from light emitting elements disposed intervals can be arranged to irradiate the entire range of the image reading surface uniformly without fluctuations in brightness. As a result, it is possible to arrange light emitting elements collectively at one position or several positions, and the manufacture of list emitting elements and mounting thereof onto the circuit board, or wiring and connections therefor can be simplified by utilizing light emitting element chips with light emitting elements mounted thereon. Therefore, since the structure of the whole image reading device is simplified and the component parts are reduced in number, it is possible to enhance the miniaturization and cost reduction of the image reading device.

Furthermore, since the light emitting element and the image surface are connected by a light waveguide passage, the light from the light emitting element can be irradiated on the image surface without any loss, and further, the mounting position of the light emitting element can be set arbitrarily. Therefore, it becomes unnecessary to adopt such a complicated structure as to mount the light emitting element in an inclined posture near the image surface apart from the light recipient device and the simplification of the structure thereof can be accomplished by mounting the light emitting element and light recipient element on the same circuit board so as to simplify the circuitry, by incorporating the light emitting element and the light recipient element into a component, by determining the arrangement of light emitting elements so as to reduce the installation space as much as possible, etc.

According to the embodiments, since a plurality of sets of light emitting elements and light recipient elements are arranged alternatively in the lengthwise direction of the image reading range, and the light waveguide passages for the light emitting elements or the light recipient elements of respective sets which are arranged at an interval are formed, an excellent image reading over the entire length of the image reading range is possible. Since the light emitting elements and the light recipient elements are arranged in a single direction, mounting of elements and assembly thereof, or electrical connection thereof can be easily and efficiently performed, and the installation space needed is small. Simply by increasing installed sets of light emitting elements and light recipient elements, it becomes possible to extend freely the length of the image reading range and to manufacture easily and at a low cost an image reading device which is capable of reading an image over a wide range at one time.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An image reading device comprising:
   a circuit board;
   a light emitting element mounted on said circuit board for irradiating light onto an image surface;
   a light receiving element mounted on said circuit board for receiving image information in the form of reflected light from the image surface; and
   light waveguide means provided between the light emitting element and the image surface and between the light receiving element and the image surface, respectively, each said light waveguide means having a plurality of light transmitting core portions and a cladding portion covering the light transmitting core portions, each of the light transmitting core portions in said light waveguide means between the light emitting element and the image surface being widened toward an end surface at the image surface to a width greater than at an end surface at the end adjacent said light emitting element.

2. An image reading device as claimed in claim 1 in which said device has a plurality of sets each having a light emitting element and a light receiving element, with the elements of the respective sets being positioned alternately in a lengthwise direction of the image reading device and with the light emitting element of each set laterally offset from the light receiving element, and the respective light waveguide means between each light emitting element and the image surface and the respective light waveguide means between each light receiving element and the image surface being widened at an image surface end, and each light waveguide means, at the image surface end, overlapping the light waveguide means of the next adjacent offset element.

3. An image reading device as claimed in claim 2 in which said light waveguide means of adjacent sets open into each other at the image surface ends.

* * * * *